United States Patent
Meier et al.

(10) Patent No.: US 11,725,165 B2
(45) Date of Patent: Aug. 15, 2023

(54) PORTION UNIT OF A CLEANING AGENT

(71) Applicant: Henkel AG & Co. KGaA, Duesseldorf (DE)

(72) Inventors: Frank Meier, Duesseldorf (DE); Matthias Sunder, Duesseldorf (DE); Uwe Trebbe, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/122,092

(22) Filed: Dec. 15, 2020

(65) Prior Publication Data

US 2021/0102147 A1   Apr. 8, 2021

Related U.S. Application Data (63) Continuation of application No. PCT/EP2019/062770, filed on May 17, 2019.

(30) Foreign Application Priority Data

Jun. 15, 2018 (DE) .......................... 102018209707.0

(51) Int. Cl.
*C11D 17/04* (2006.01)
*C11D 3/37* (2006.01)
*C11D 11/00* (2006.01)

(52) U.S. Cl.
CPC .......... *C11D 17/045* (2013.01); *C11D 3/3753* (2013.01); *C11D 11/0017* (2013.01)

(58) Field of Classification Search
None
See application file for complete search history.

(56) References Cited

U.S. PATENT DOCUMENTS

| 2008/0014392 A1* | 1/2008 | Ayats | C11D 17/045 264/241 |
| 2013/0181382 A1 | 7/2013 | Aich et al. | |
| 2016/0312158 A1* | 10/2016 | Miracle | C11D 17/042 |
| 2017/0067003 A1* | 3/2017 | Souter | C11D 17/042 |

(Continued)

FOREIGN PATENT DOCUMENTS

| DE | 102004062328 A1 | 6/2006 |
| DE | 102014014767 A1 | 4/2016 |
| DE | 102015204170 A1 | 9/2016 |

(Continued)

OTHER PUBLICATIONS

International Search Report & Written Opinion PCT/EP2019/062770 Completed: Aug. 12, 2019; dated Aug. 21, 2019 6 Pages.

*Primary Examiner* — Lorna M Douyon
(74) *Attorney, Agent, or Firm* — James J. Cummings (57) ABSTRACT

A portion unit of a cleaning agent, having a cleaning agent composition and a chamber which receives the cleaning agent composition and includes a chamber wall that delimits the chamber and has a layer thickness D. The chamber includes a main volume and at least one auxiliary volume, and the cleaning agent composition can freely enter the at least one auxiliary volume from the main volume and vice versa, wherein the chamber wall is formed in a transition region between the main volume and the at least one auxiliary volume in a substantially stepped manner. The invention additionally relates to a method for producing such a portion unit.

13 Claims, 3 Drawing Sheets

(56) References Cited

U.S. PATENT DOCUMENTS

2018/0105775 A1* 4/2018 Fox ................... C11D 17/044
2019/0292496 A1* 9/2019 Miracle .................. C11D 3/40

FOREIGN PATENT DOCUMENTS

| EP | 2902473 A1 | 8/2015 |
| EP | 2927307 A1 | 10/2015 |
| WO | 02085736 A1 | 10/2002 |

* cited by examiner

PORTION UNIT OF A CLEANING AGENT

FIELD OF THE INVENTION

The present invention relates to a portion unit of a cleaning agent, comprising a cleaning agent composition and a chamber which receives the cleaning agent composition, the chamber comprising a main volume and at least one auxiliary volume. The invention also relates to a method for producing a portion unit of this kind.

BACKGROUND OF THE INVENTION

Within the meaning of the invention, the term cleaning agent comprises any washing and cleaning agent compositions which are suitable, inter alia, for use in a washing machine, and/or a dishwasher.

Cleaning agents in solid, powder, wax, gel and/or liquid form for use in washing machines or dishwashers are now often offered in premetered portion units. These portion units are particularly user-friendly thanks to a water-soluble packaging by means of which a single dose of the cleaning agent can be added directly to the machine. The water-soluble packaging then dissolves in the course of the cleaning process in the substantially water-based cleaning liquor and the cleaning agent is released. In this way, a user does not come into contact with the cleaning agent, which is felt to be very advantageous. Portion units of this kind having water-soluble packaging are described, for example, in DE 10 2014 014 767 A1.

In addition to single-chamber systems in which a single dose of the cleaning agent is enclosed in a single chamber formed by the water-soluble packaging, multi-chamber systems are also known, for example, from DE 10 2015 204 170 A1 and WO 02/085736 A1, in which the packaging has a plurality of separate chambers, each filled with a proportion of the cleaning agent dose. All the chambers of the multi-chamber system are filled with the same cleaning agent composition, but different components of the cleaning agent can also be enclosed in different chambers.

In multi-chamber systems, a further distinction is made between packaging in which the individual chambers are arranged next to one another and packaging in which the individual chambers are arranged at least partly one above the other. In the latter, which are also referred to as compact multi-chamber systems, a larger chamber often serves as a base on which a plurality of, for example two or three, smaller chambers are arranged. The individual chambers are separated from one another such that cleaning agents cannot pass from one chamber to another.

It has been shown that a multi-chamber design of the portion units of this kind is considered to be modern and appealing by the consumer and is therefore very well received by the market.

Irrespective of this, however, it has also been shown that portion units designed in this way have various disadvantages in use. The consumption of packaging material for multi-chamber systems is on average 10 to 50% higher than for single-chamber systems with the same filling volume. For a one-chamber system, a first film portion is generally formed into a receiving volume, which is then filled with the cleaning agent composition, in a vacuum thermoforming method. Finally, the receiving volume is closed by a second film portion serving as a cover element, by the second film portion being sealed to the receiving volume in an edge region. In contrast, for a compact multi-chamber system in which the individual chambers are arranged one above the other, at least one further film portion is required by means of which the individual chambers are separated from one another. In multi-chamber systems in which the individual chambers are arranged next to one another, sufficiently wide sealing seams between the individual chambers are required in order to reliably separate the chambers. This also significantly increases the consumption of film material compared to single-chamber systems.

In addition to the greater material consumption, in particular multi-chamber systems having chambers arranged next to one another have the further disadvantage that they are comparatively large and demonstrate unfavorable movement behavior in the washing machine compared to portion units having smaller dimensions. It has been shown that large portion units within the washing machine increasingly stick to the rubber seal or in the gap in the rubber seal below the loading hatch. There, if at all, they are only washed around by a small amount of water-based cleaning liquor and there is no sufficient mechanical action from the items to be cleaned, as is the case inside the cleaning space (e.g. washing drum). Due to these circumstances, the film packaging of a portion unit stuck in this way often does not dissolve in the intended time and undesirable residues of cleaning agent and/or film packaging remain in the region of the rubber seal.

Finally, multi-chamber systems having chambers arranged next to one another tend to float on the surface of the cleaning liquor or "ride" on the items to be cleaned due to their large surface area, which means that the mechanical impact of the cleaning liquor and the items to be cleaned is very low on the portion units. This delays the dissolving of the film packaging, as a result of which the cleaning agent may not be released at the right time within a cleaning program. Remnants of the film packaging may also remain in the cleaning liquor and possibly on the items to be cleaned, since the film packaging dissolves too slowly.

BRIEF SUMMARY OF THE INVENTION

Therefore, an object of the present invention is that of providing a portion unit of a cleaning agent that has an appealing, modern design and overcomes the disadvantages of the prior art. A further object of the invention is that of providing a method for producing a portion unit of this kind.

The object is achieved by means of a portion unit of a cleaning agent comprising a cleaning agent composition and a chamber which receives the cleaning agent composition and comprises a chamber wall that delimits the chamber and has a layer thickness and by means of a method for producing a portion unit of a cleaning agent wherein the chamber is filled with a plurality of cleaning agent compositions of different dosage forms.

Advantageous embodiments and developments of the invention are found in the claims.

The invention is a portion unit of a cleaning agent, comprising a cleaning agent composition and a chamber which receives the cleaning agent composition and comprises a chamber wall that delimits the chamber and has a layer thickness D, wherein the chamber comprises a main volume and at least one auxiliary volume, and wherein the cleaning agent composition can freely enter the at least one auxiliary volume from the main volume and vice versa, and wherein the chamber wall is formed in a transition region between the main volume and the at least one auxiliary volume in a substantially stepped manner.

In other words, the portion unit according to the invention is distinguished by the fact that, although it is designed as a single-chamber system, it also has, in addition to the visual appearance, further detailed features of a multi-chamber system. The portion unit has a chamber for receiving a cleaning agent composition, the chamber comprising a main volume and at least one auxiliary volume. However, these at least two partial volumes are not separated from one another by a wall or the like; rather, the cleaning agent composition can in principle flow freely between the main volume and the at least one auxiliary volume. The chamber wall is formed in a transition region between the main volume and the at least one auxiliary volume in a substantially stepped manner. In this way, the main volume and the at least one auxiliary volume can be visually perceived by a consumer as separate volumes. A portion unit according to the invention thus offers the appealing design of a multi-chamber system on the outside, but behaves substantially like a one-chamber system during use and when filled with a substantially homogeneous cleaning agent composition due to its internally permeable structure. With regard to material consumption and residue-free solubility, the portion unit according to the invention is thus superior to classic multi-chamber systems. Furthermore, a portion unit of this kind having at least one auxiliary volume offers advantages in handling due to its improved grip.

According to the invention, the chamber wall is formed in a transition region between the main volume and the at least one auxiliary volume in a substantially stepped manner. Such a design in a stepped manner can be produced, for example, in a vacuum thermoforming method when using a thermoforming mold having a bottom region in a correspondingly stepped manner. A corresponding step or recess in the bottom of a thermoforming mold can emerge from the bottom region at an angle of approximately 90°, but angles smaller or greater than 90°, preferably between 45° and 135°, can also be formed. Accordingly, in the portion unit according to the invention, the transition region between the main volume and the at least one auxiliary volume can be designed differently in a concise manner. It should be taken into account here that even with a right-angled step in the thermoforming mold, the transition between the two regions in question generally deviates from the exactly rectangular shape in the finished portion unit due to the elasticity of the material for the chamber wall and the associated restoring forces after removal from the thermoforming mold. A substantially stepped design of the transition region between the main volume and the at least one auxiliary volume is to be understood here to mean that the chamber wall in the region of the at least one auxiliary volume is at least clearly visible spatially in relation to the chamber wall in the region of the main volume, so that a viewer has the visual impression of a plurality of partial volumes, the at least one auxiliary volume spatially protruding at least partially from the main volume. The at least one auxiliary volume protruding spatially with respect to the main volume thus initially enlarges the outer surface of the portion unit and thus facilitates the solubility of the water-soluble film forming the surrounding outer wall. Furthermore, the at least one spatially protruding auxiliary volume ensures an improved grip of the portion unit and thus facilitates its handling.

The material consumption for a portion unit according to the invention is less than that for a classic multi-chamber system and substantially corresponds to that for a conventional single-chamber system with the same filling volume and the same dimensions, since an additional film layer and/or sealing seams between the individual chambers can be advantageously dispensed with. Only two film layers are required to produce the portion unit according to the invention.

Comparative tests have shown that the behavior of the portion unit according to the invention in the washing machine is superior to the multi-chamber systems known from the prior art with regard to solubility and material residues, which will be explained in more detail below with reference to comparative examples.

According to one embodiment of the concept of the invention, the at least one auxiliary volume is designed as a protuberance in the chamber wall, the maximum height H of the protuberance being at least five times the layer thickness D of the chamber wall. The height H of the protuberance is understood to be the height H of the protuberance with respect to the non-protuberant chamber wall. The protuberance according to the invention in the chamber wall thus clearly differs from a simple embossing or marking of the chamber wall, which generally does not go beyond one to two times the layer thickness D. The layer thickness D is understood here to mean the wall thickness of the chamber wall of the finished portion unit. This usually deviates from the thickness of the film used as the starting material in a vacuum thermoforming method, since the forming process generally involves stretching the starting material. The layer thickness D is set in such a way that the protuberances in the chamber wall do not, or at least do not substantially, retract after the finished portion unit has been removed from the thermoforming mold. Suitable layer thicknesses D are in the range of approximately 70 to 120 μm, depending on the specific material.

It can also be provided that the maximum height H of the protuberance is at least ten times the layer thickness D of the chamber wall. With an assumed layer thickness D of approximately 100 μm, the maximum height H of the protuberance is at least 1 mm. The maximum height H of the protuberance can also be several millimeters.

An embodiment of the invention provides that the at least one auxiliary volume comprises a proportion of 1 to 30% of a total volume, consisting of the main volume and the at least one auxiliary volume. It is preferably provided that the at least one auxiliary volume comprises a proportion of 1-15% of the total volume. The total volume of the chamber is made up of the main volume and the at least one auxiliary volume. In the case of a single auxiliary volume, the total volume is composed of the main volume and the auxiliary volume and the auxiliary volume comprises a proportion of 1-10%, preferably 1-5%, of the total volume. In the case of a plurality of auxiliary volumes, the total volume is composed of the main volume and the total of the auxiliary volumes and the total of the auxiliary volumes comprises a proportion of 1-30%, preferably 3-15%, of the total volume.

In one embodiment of the invention, the chamber comprises two or more auxiliary volumes. These can be arranged next to one another on the same side of the portion unit and/or on opposite sides of the portion unit. When the portion unit is produced in a vacuum thermoforming method, as will be described in more detail below, a receiving volume is formed from a first film portion and a cover element is formed from a second film portion. The receiving volume and the cover element together form the chamber; the chamber wall is formed by the first and second film portions. The auxiliary volumes according to the invention can preferably be formed in the region of the receptacle volume, but they can also be formed in the region of the cover element or both in the region of the receptacle volume and in the region of the cover element. Even in the case of a single auxiliary volume, this can be formed either in the region of the receiving volume or in the region of the cover element. The number of auxiliary volumes can generally be in a range of from one to ten. This number is preferably in a range of from three to five.

In accordance with a further concept of the invention, it can be provided that the totality of the auxiliary volumes is shaped in such a way that it does not have any mirror symmetry. In this case, the auxiliary volumes can be washed around by the water more cheaply, which is advantageous with regard to the solubility of the product. In the case of a single auxiliary volume, this can have a shape which has no mirror symmetry, for example that of an asymmetrical drop. If there are several auxiliary volumes, all of the auxiliary volumes can be designed in such a way that they do not have mirror symmetry. However, the auxiliary volumes can also be shaped in such a way that individual auxiliary volumes have mirror symmetry, but the entirety of the auxiliary volumes is not mirror-symmetrical. The entirety of the auxiliary volumes can certainly have point symmetry. The shape of an auxiliary volume is understood to mean a projection of the respective volume into a plane parallel to the interface between the receiving volume and the cover element.

The main shape of the portion unit can in principle be of any design. According to one embodiment, the portion unit can have a substantially triangular main shape. However, it can also have a substantially circular, rectangular, square or any curved main shape. The main shape is understood to be a projection of the portion unit into a plane parallel to the interface between the receiving volume and the cover element.

An advantageous embodiment of the invention provides that the chamber wall comprises a water-soluble material, in particular a water-soluble film. In this case, the portion unit as a whole can be placed in the washing machine or dishwasher without the packaging having to be removed beforehand. The water-soluble material can comprise a polymer, a copolymer or mixtures thereof. Water-soluble polymers within the meaning of the invention are polymers which are more than 2.5 wt. % soluble in water at room temperature.

The water-soluble material may comprise a polyvinyl alcohol copolymer (PVA). PVA is a thermoplastic and is therefore very suitable for processing in a thermoforming method, in particular in a vacuum thermoforming method. It also has very good water solubility. The water-soluble material can comprise mixtures of different substances. Such mixtures enable the mechanical properties of the chamber wall to be adjusted and can influence the degree of water solubility.

According to one embodiment of the invention, the portion unit according to the invention is produced in a vacuum thermoforming method, hereinafter also referred to briefly as a thermoforming method. The auxiliary volumes can be formed by using a thermoforming mold with a stepped base area. For this purpose, the bottom region of the thermoforming mold is provided with step-shaped depressions corresponding to the desired number and shape of the auxiliary volumes.

The invention also describes a method for producing a portion unit of a cleaning agent, comprising the following steps:

preheating a first water-soluble film portion over a thermoforming mold, of which the bottom has at least one recess;

applying a negative pressure to the thermoforming mold, thereby sucking the preheated film portion into the thermoforming mold and forming a receiving volume consisting of the first water-soluble film portion, wherein the receiving volume comprises a main volume and at least one auxiliary volume;

filling a cleaning agent composition into the receiving volume;

placing a cover element consisting of a second water-soluble film portion on the filled receiving volume;

welding the cover element to the receiving volume in an edge region by means of moisture and/or temperature such that the main volume and the at least one auxiliary volume can communicate with one another;

removing the portion unit from the thermoforming mold.

To produce the portion unit according to the invention, therefore, only two film portions are required, a receiving volume being formed from a first film portion and a cover element being formed from a second film portion. In contrast, at least three film portions are required to produce a compact multi-chamber system known from the prior art.

According to the invention, one or more auxiliary volumes are also formed in the cover element in a preceding method step in a thermoforming method before the cover element is placed on the receiving volume. In this way, a portion unit can be produced, which has auxiliary volumes in the chamber wall on two opposite sides.

The at least one cleaning agent composition to be filled into the receiving volume of the portion unit can in principle be a solid, powder, wax, gel or liquid composition and/or mixtures of such compositions. Liquid cleaning agent compositions are often preferred when particularly rapid solubility is important, as is the case with textile washing processes, for example. Dimensionally stable cleaning agent compositions, such as solid, powder, wax, or gel compositions, have the advantage that they can absorb certain active substances particularly well. In this respect, the suitable cleaning agent compositions or their dosage forms can be specifically selected and combined depending on the application. Examples of such compositions are given below.

According to a preferred embodiment of the invention, the portion unit can be filled with a combination of cleaning agent compositions of different dosage forms (e.g. solid, powder, wax, gel, liquid). Here, as a filling for the chamber of the portion unit, a plurality of cleaning agent compositions with a dimensionally stable dosage form can be freely combined with one another. For example, two or more cleaning agent compositions with a solid or powder dosage form can be combined with wax or gel cleaning agent compositions as the filling material for the portion unit. This has the advantage that completely new forms of appearance and, if applicable, acting effects for the portion unit are achieved or can be adjusted in a targeted manner by the multiple cleaning agent compositions with different dosage forms. As there is a correspondingly high packing density of the individual cleaning agent compositions within the chamber of the portion unit, the cleaning agent compositions of different dosage forms do not mix with one another, but rather are present separately in the portion unit. As a result, the cleaning agent compositions with different dosage forms, comparable to a plurality of phases, are each arranged separately from one another and/or one above the other within the portion unit.

Within the meaning of a further development of the previous approach of the invention, it proves useful to fill the main volume of the portion unit with a first cleaning agent composition, while the at least one auxiliary volume is filled with at least one other, different cleaning agent composition. As a result, advantages can be achieved both in terms of the effects of action and in terms of appearance. Furthermore, the main volume of the portion unit is preferably filled with a first cleaning composition having a first dosage form, while the at least one auxiliary volume is filled with at least one second cleaning agent composition having at least one other, different dosage form. In particular, the main volume of the portion unit is filled with a first cleaning agent composition having a first dosage form, while all auxiliary volumes, depending on the application, are filled with other, different cleaning agent compositions having a second dosage form. For example, the main volume is filled with a solid or powder cleaning agent composition, and all the auxiliary volumes, depending on the application, are filled with gel or wax cleaning agent compositions. Above all as a result of the design of the main volume and the at least one auxiliary volume according to the invention, the plurality of cleaning agent compositions having different dosage forms are cleanly separated from one another but at the same time housed together in one chamber of the portion unit. Of course, in addition to the examples mentioned, other combinations of a plurality of cleaning agent compositions having different dosage forms in the main and auxiliary volumes of the portion unit are also conceivable. In this way, portion units with a particularly appealing appearance can initially be obtained. Furthermore, individual zones of different cleaning agent compositions within the portion unit can be responsible for different effects of the portion unit. For example, each individual cleaning agent composition can be specifically designed to have certain cleaning effects for the overall cleaning effect. In addition, portion units according to the invention have advantages with regard to the strength of the portion unit due to the special design of the chamber wall and different, in particular, dimensionally stable cleaning agent compositions within the chamber.

BRIEF DESCRIPTION OF THE DRAWINGS

The invention is explained in greater detail below on the basis of embodiments and with reference to the accompanying drawings, in which.

DETAILED DESCRIPTION OF THE INVENTION

Figure 1:
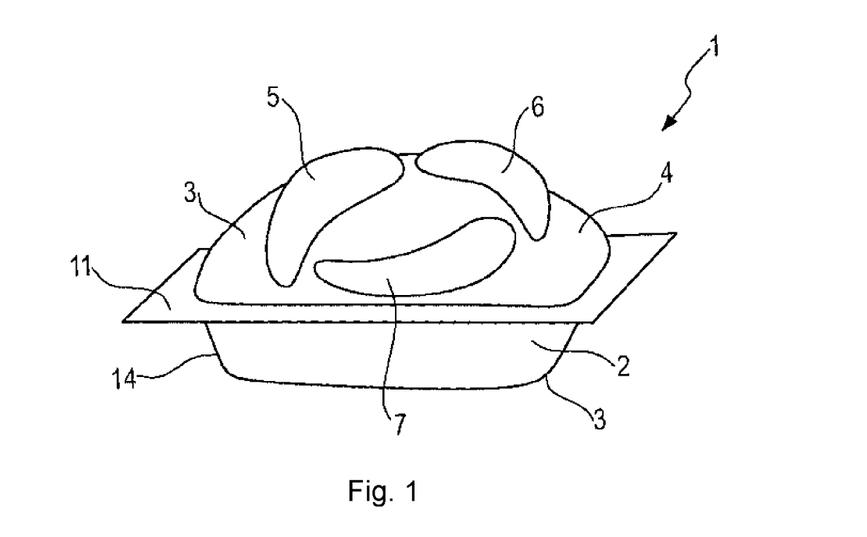
FIG. 1 shows an embodiment of a portion unit according to the invention in perspective view.

FIG. 1 shows an embodiment of a portion unit according to the invention, generally designated 1, in a perspective view. The portion unit 1 comprises a chamber 2, in which a cleaning agent composition, not shown here, is contained. The chamber 2 is delimited by a chamber wall 3 which is made of a water-soluble plastics film. As will be explained in more detail in connection with the production method, the chamber wall 3 is made from two film portions, wherein the upper half of the portion unit 1 in the illustration in FIG. 1 is made from a first film portion, while the lower half of the portion unit 1, which is also referred to below as the cover element 14, in the illustration in FIG. 1 is made from a second film portion. The two film portions are welded together in the region of a sealing edge 11.

The chamber wall 3 has a layer thickness D of 90 μm. The chamber 2 comprises a main volume 4 and three auxiliary volumes 5, 6 and 7. The cleaning agent composition contained in the chamber 2 can in principle enter the auxiliary volumes 5, 6 and 7 freely from the main volume 4 and vice versa, since the auxiliary volumes 5, 6 and 7 cannot be separated from the main volume 4 by a physical separating device, i.e. a wall or the like.

Figure 2:
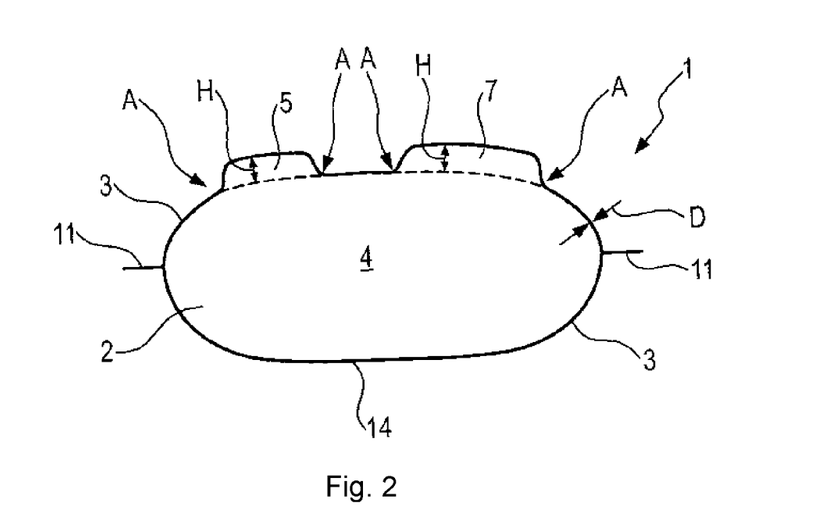
FIG. 2 shows an embodiment of a portion unit according to the invention in a sectional view.

This becomes clearer from the illustration in FIG. 2, which shows an exemplary embodiment of a portion unit 1 according to the invention in a sectional view. It is clear here that a cleaning agent composition accommodated in the chamber 2, not shown here, can in principle flow freely between the volumes 4, 5-7 (auxiliary volume 6 not shown in the sectional view according to FIG. 2), since no physical separating elements are provided between the main and the at least one auxiliary volume. Dashed lines between the main volume 4 and the auxiliary volumes 5-7 only indicate in which region the main volume 4 merges into the auxiliary volumes 5-7. The portion unit 1 according to the invention does not have any physical separation between the individual volumes 4-7 in these regions.

The chamber wall 3 is formed in a transition region between the main volume 4 and the auxiliary volumes 5, 6 and 7 in a substantially stepped manner. This is also best seen in FIG. 2, in which the transition region between the main volume 4 and the auxiliary volumes 5-7 is identified in each case by A. Due to the stepped design of the chamber wall 3 in the transition regions A, the portion unit has a purely external appearance similar to that of a classic multi-chamber system, since the different partial volumes can be perceived as such. In particular, the auxiliary volumes 5-7 project spatially from the main volume 4, so that the outer walls of the auxiliary volumes 5-7 protrude proximally from the outer wall of the main volume.

The auxiliary volumes 5, 6 and 7 are designed as protuberances in the chamber wall 3, the maximum height H of the protuberances in each case being more than 10 times the layer thickness D of the chamber wall 3.

In the exemplary embodiment shown in FIG. 1, the auxiliary volumes 5, 6 and 7 together comprise approximately 10% of the total volume of the chamber 3, the total volume of the chamber 3 being composed of the main volume 4 and the auxiliary volumes 5, 6 and 7.

Figure 3:
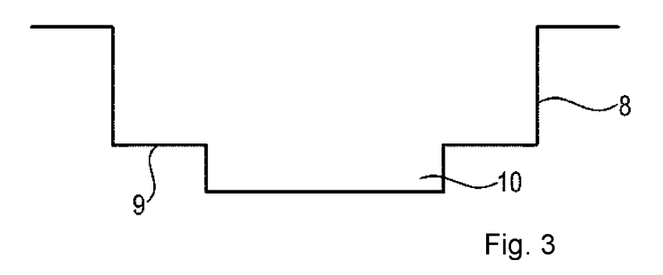
FIG. 3 shows an example of a thermoforming mold suitable for producing a portion unit according to the invention in schematic sectional view.

The portion units shown can be produced in a thermoforming method. FIG. 3 shows a thermoforming mold 8 suitable for this in a basic sectional view. The thermoforming mold 8 has a bottom 9 which comprises at least one step-shaped recess 10 for each associated auxiliary volume. The thermoforming mold 8 shown here has only a single recess 10 in the bottom 9, so that it is suitable for producing a portion unit with only one auxiliary volume. In order to form a plurality of auxiliary volumes, as shown, for example, in FIGS. 1 and 2, thermoforming molds are used which have a plurality of recesses 10 in the bottom region 9.

A portion unit 1 is produced as follows: First, a first water-soluble film portion is inserted into a thermoforming mold 8, as is shown, for example, in FIG. 3, of which the bottom 9 has at least one step-shaped recess 10. The thermoforming mold 8 is then heated and a suppressor is applied. As a result, the film portion abuts the inside of the mold wall such that a receiving volume comprising a main volume 4 and at least one auxiliary volume 5, 6, 7 is formed. At least one cleaning agent composition is filled into the receiving volume. As already mentioned above, a plurality of, especially different, cleaning agent compositions, in particular also having different dosage forms, can preferably be filled in here. Since cleaning agent compositions having different, especially dimensionally stable dosage forms, such as solid, powder, gel, or wax cleaning agent compositions, usually do not mix within the portion unit 1, there is the possibility to equip the chamber 2 of the portion unit 1 with a plurality of zones of different cleaning agent compositions. For example, these zones of different cleaning agent compositions can be set in a targeted manner by appropriately skillful parallel or sequential filling of the chamber 2 of the portion unit 1, especially with cleaning agent compositions of different dosage forms. This is particularly effective if the main volume 4 and the at least one auxiliary volume 5-7 are filled with cleaning agent compositions of different dimensionally stable dosage forms. For example, the auxiliary volumes 5-7, depending on the application, can preferably be filled with solid, gel or wax cleaning agent compositions, while the main volume is filled with powder cleaning agent compositions. It proves to be advantageous first to fill the auxiliary volumes 5-7, depending on the application, preferably with solid, gel or wax cleaning agent compositions and only then to fill the main volume with powder cleaning agent compositions. Of course, depending on the particular application, the combination of a plurality of cleaning agent compositions with another, especially dimensionally stable dosage form is also conceivable. This also relates in particular to the distribution of other dosage forms over the main volume 4 and the individual auxiliary volumes 5-7. In particular, the filling of main volume 4 and auxiliary volumes 5-7 with cleaning agent compositions of different dimensionally stable dosage forms ensures a clean separation of the individual zones of different cleaning agent compositions within the portion unit 1. A cover element 14 made of a second water-soluble film portion is then placed on the filled receiving volume. In an edge region, the cover element 14 is welded to the receiving volume, so that a sealing edge 11 which can be seen in FIGS. 1 and 2 is formed. The permeability between the main volume 4 and the at least one auxiliary volume 5, 6, 7 is not impaired by the welding in an edge region. Finally, the finished portion unit 1 is removed from the thermoforming mold. In this way, portion units with a particularly appealing appearance can initially be obtained. Furthermore, the individual zones of different cleaning agent compositions can be responsible for different effects of the portion unit. For example, each individual cleaning agent composition can be specifically designed to have certain cleaning effects for the overall cleaning effect. In addition, portion units according to the invention with a corresponding design of the chamber wall and filling with different, in particular dimensionally stable, cleaning agent compositions have a significantly increased strength of the entire portion unit.

Figure 4A:
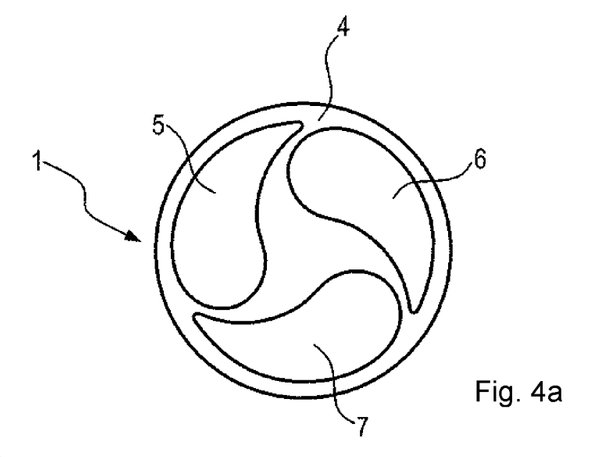
FIGS. 4a-4e show exemplary embodiments of a portion unit according to the invention in schematic plan view.
Figure 4B:
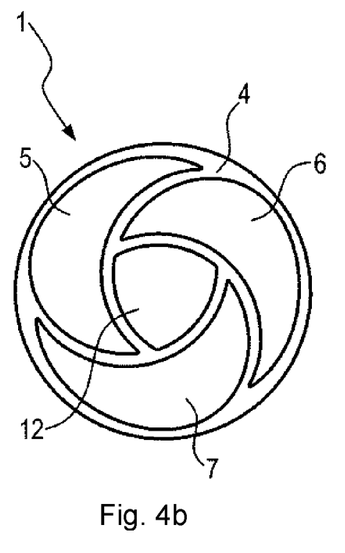
Figure 4C:
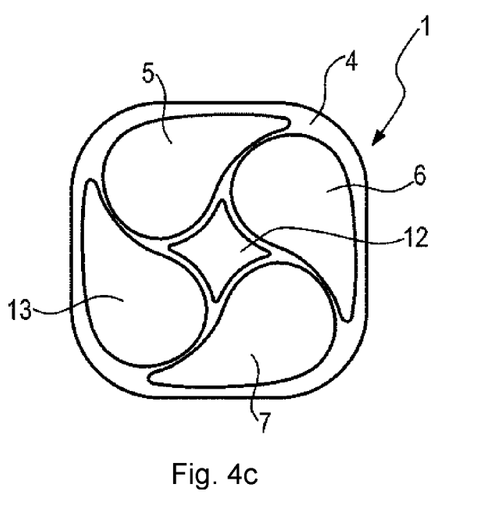
Figure 4D:
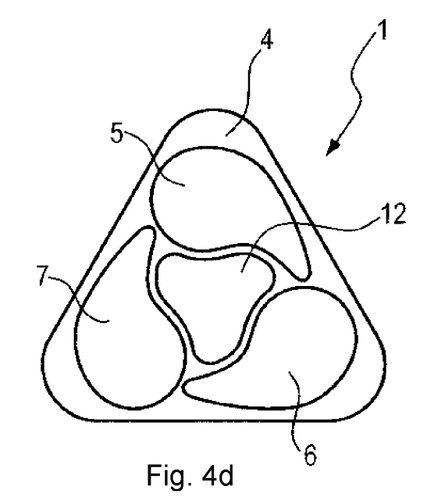
Figure 4E:
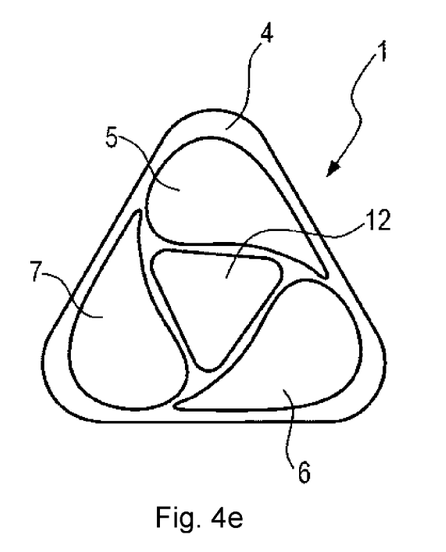

FIGS. 4a to 4e show exemplary embodiments of a portion unit 1 according to the invention in a schematic plan view. The portion unit 1 can have different main shapes in plan view. FIGS. 4a and 4b each show a circular main shape, while FIG. 4c has a rectangular, substantially square main shape. FIGS. 4d and 4e show examples of a triangular main shape of the portion unit 1. Regardless of the main shape of the portion unit 1, a different number of auxiliary volumes 5, 6, 7, 12 and 13 can be provided and these can be arranged and shaped differently. For example, the shape of an auxiliary volume can be drop-shaped or crescent-shaped. In this case, three or four drop-shaped or crescent-shaped auxiliary volumes 5, 6, 7, 13 can be provided, which are arranged around a further auxiliary volume 12 placed centrally in the middle. In other embodiments, the center can also remain free, as shown in FIG. 4a. Embodiments having only one or two auxiliary volumes are also possible. In order to ensure that the auxiliary volumes are optimally washed around by the water-based cleaning liquor when used in a washing machine or dishwasher, the auxiliary volumes are preferably shaped and arranged such that, in their entirety, they have no mirror symmetry whatsoever. Individual auxiliary volumes, such as auxiliary volume 12 in FIGS. 4b and 4c, can certainly have mirror symmetry, but all the auxiliary volumes are preferably not mirror-symmetrical.

Using a comparative example, the advantages of the portion unit according to the invention compared to portion units known from the prior art are exemplified below.

In a first step, two liquids A and B were produced. A liquid phase of composition A was produced from the following ingredients:

| Ingredient | wt. % |
| --- | --- |
| Polypropylene glycol | 8.2 |
| Glycerol | 10.5 |
| Optical brightener | 0.6 |
| Linear alkyl benzene sulfonate | 22.0 |
| C13/15 oxo alcohol having 8 EO | 24.0 |
| Monoethanolamine for saponification | 6.0 |
| C12-18 soap | 7.5 |
| Polyethyleneimine polymer | 6.0 |
| DTPMPA 7Na | 0.7 |
| Ethanol | 3.0 |
| Soil release polymer | 1.4 |
| Perfume | 1.7 |
| Dye | 0.01 |
| Water | 8.39 |

Recipe composition A contains 8.39 wt. % water from additive and raw materials, and all the listed ingredients as active substances.

A liquid phase of composition B was produced from the following ingredients:

| Ingredient | wt. % |
| --- | --- |
| Polypropylene glycol | 7.8 |
| Glycerol | 10.1 |
| Linear alkyl benzene sulfonate | 17.6 |
| C13/15 oxo alcohol having 8 EO | 24.0 |
| Monoethanolamine for saponification | 4.8 |
| C12-18 soap | 6.0 |
| Polyethyleneimine polymer | 6.0 |
| DTPMPA 7Na | 0.7 |
| Ethanol | 3.0 |
| Soil release polymer | 1.4 |
| Perfume | 1.7 |
| Enzyme mixture (protease, mannanase, amylase, cellulase) | 8.5 |
| Dye | 0.01 |
| Water | 8.39 |

Recipe composition B contains 8.39 wt. % water from direct additives and the raw materials with the exception of the enzyme mixture. The water content of the enzyme mixture was not taken into account. All ingredient information is available as an active substance with the exception of the enzyme mixture, here a total of 8.5% of the commercially available enzyme solutions was added as a mixture.

In a subsequent step, different water-soluble portion units C2, C3, E1, E2 were produced and filled with the liquids A and B. The water-soluble film Aicello Solublon GA from the provider Aicello was used as the material for the chamber wall of the portion units for all different portion units. The individual film thicknesses and dimensions of the portion units are listed in the table below.

1. Production of water-soluble portion units C2 and C3:
C2 and C3 are each designed as double chamber portion units, in which two separate chambers are arranged next to one another. The portion units C2 and C3 were produced from two film portions in a double chamber cavity at a thermoforming temperature of 102° C. and a sealing temperature of 150° C. 16.5 g of the liquid A was introduced into the first chamber and 8.5 g of the liquid B into the second chamber.

2. Production of water-soluble portion units E1 and E2 according to the invention:
E1 and E2 are each single-chamber portion units having a main volume and at least one auxiliary volume according to the present invention. The portion units E1 and E2 were produced from two film portions in a mold with a stepped bottom region at a thermoforming temperature of 102° C. and at a sealing temperature of 150° C. 25 g of the liquid AB was introduced into the single chamber, the liquid AB containing the liquids A and B in a ratio of 2:1 (A:B=2:1).

In addition, a further commercially available portion unit C1 (Tide Pods 3:1 from Procter & Gamble, manufactured on 12 Jun. 2017) was used for the comparative example, which is designed as a compact multi-chamber system, in which two further separate chambers on a base chamber are arranged above the base chamber. The portion unit C1 is formed from three PVA film portions and is filled with a total of 24.8 g of a cleaning agent composition, of which 21.4 g is received by the base chamber and 1.7 g is received by the two chambers arranged on the base chamber.

The table below shows the test parameters in comparison.

cifically, 1 liter of distilled water at a temperature of 20±1° C. was placed in a 2-liter beaker in a first test cycle. The sachets were placed in the water and, if necessary, fixed under the water surface with a tripod clamp to create comparable conditions. The time until the first product outlet was recorded (the first release of a cleaning agent composition was assessed in several chambers). As part of a second test cycle, 1 liter of distilled water was placed in a 2-liter beaker, but at a higher temperature of 28±1° C. The sachets were placed in the water and, if necessary, held under the surface of the water with a tripod clamp to create comparable conditions. It was gently stirred with a stir bar at 200 revolutions per minute. The time was recorded until no visible film components could be seen in the beaker.

Average values of the 25 individual tests are given below as results.

Results of laboratory test:

The first product release took place in the laboratory test after the first test cycle for all samples in all 25 repetitions after more than 30 s. The complete dissolution of the respective portion units within the second test cycle took place after the following times (average values from 25 repetitions):

C1: 4:55 minutes
C2: 4:38 minutes
C3: 4:25 minutes
E1: 4:22 minutes
E2: 4:14 minutes The complete dissolution of the portion units E1 and E2 according to the invention thus took place significantly faster (on average at least 10 seconds) than in the comparative samples C2-C3 with the same film type and the same

| Portion unit | C1 3 Chambers on top of one another | C2 2 Chambers next to one another | C3 2 Chambers next to one another | E1 1 Chamber with auxiliary volume | E2 1 Chamber with auxiliary volume |
|---|---|---|---|---|---|
| Filling quantity | 24.8 g (21.4 g + 2 × 1.7 g) | 25.0 g (16.5 g + 8.5 g) | 25.0 g (16.5 g + 8.5 g) | 25.0 g | 25.0 g |
| Dimensions | 50 × 40 mm | 65 × 58 mm | 65 × 58 mm | 54 × 58 mm | 54 × 58 mm |
| Film thickness | 240 μm total (2 layers of 75 μm and 1 layer of 90 μm) | 75 μm (cover element) and 90 μm (receiving volume) | 70 μm (cover element) and 90 μm (receiving volume) | 75 μm (cover element) and 90 μm (receiving volume) | 70 μm (cover element) and 90 μm (receiving volume) |
| Film weight | 0.8 g | 0.9 g | 0.86 g | 0.75 g | 0.7 g |

First, the mechanical properties of the portion units C1, C2, C3, E1, E2 were tested in a pressure test at 25 repetitions each. The portion units for the measurement were conditioned for 24 hours at 23±1° C. and 50±2% relative humidity. A Zwick Roell pressure testing machine was used for the measurement. The portion unit was positioned with the largest surface on the lower plate and subjected to a pressure of 300 N for 30 seconds. (Pressure ramp 250 mm/min). In the pressure test, all samples C1, C2, C3, E1, E2 showed equally good mechanical properties; all 25 out of 25 samples achieved compressive strengths of over 300 Nm.

Furthermore, the solubility of the individual sachets was determined and compared in various tests, first in a laboratory test at 2 temperatures in a beaker and in a practical test inside a washing machine.

As part of the laboratory test, the solubility of the portion units was generally determined with 25 repetitions; both the time of the first product release and the time until the entire portion unit was completely dissolved were detected. Spelayer thickness and considerably faster than in the comparative sample C1 (on average at least 30 seconds).

In addition, the samples were subjected to a practical test inside a washing machine with regard to possible product residues. The previously described samples C1, C2, C3, E1, E2 which had aged for 6 weeks at room temperature were also used for this. The washing machine test was run with all samples with 25 repetitions. The result was assessed after a washing time of 10 minutes and after the washing program had ended. The washing machine test was carried out in detail in a Miele W1714 washing machine; a 30° C. cotton program was selected as the program. The program ran for 2 hours and 5 minutes, the washing machine was loaded with 3.5 kg of cotton laundry. The portion units C1, C2, C3, E1, E2 were initially positioned under the laundry.

The washing machine test delivered the following results:
C1: After 10 minutes of washing, residues were found in 7 out of 25 repetitions and after the washing program ended in 3 out of 25 repetitions.

C2: After 10 minutes of washing, residues were found in 8 out of 25 repetitions and after the washing program ended in 4 out of 25 repetitions.

C3: After 10 minutes of washing, residues were found in 6 out of 25 repetitions, after the washing program had ended in 2 out of 25 repetitions.

E1: After 10 minutes of washing, residues were found in 4 of 25 repetitions, and none of the 25 repetitions after the end of the washing program.

E2: After 10 minutes of washing, residues were found in 5 of 25 repetitions, and none of the 25 repetitions after the end of the washing program.

Residues of the cleaning agent composition or film residues were found in the slot of the rubber sleeve or on the rubber sleeve in the region of the loading hatch of the washing machine for all sample variants.

In comparison, the portion units E1, E2 according to the invention thus showed the best residue values in the washing machine test, in particular they were the only sample variants that showed no product and/or film residues after the end of the washing program.

What is claimed is:

1. A portion unit of a cleaning agent, comprising a cleaning agent composition and a chamber which receives the cleaning agent composition and comprises a chamber wall that delimits the chamber and has a layer thickness, the chamber comprising a main volume and at least one auxiliary volume, wherein the cleaning agent composition can freely enter the at least one auxiliary volume from the main volume and vice versa, and in that the chamber wall is formed in a transition region between the main volume and the at least one auxiliary volume in a substantially stepped manner, wherein the at least one auxiliary volume comprises a proportion of 1-30% of a total volume, consisting of the main volume and the at least one auxiliary volume, and wherein the entirety of the auxiliary volumes is shaped such that the auxiliary volumes have no mirror symmetry.

2. The portion unit of a cleaning agent according to claim 1, wherein the at least one auxiliary volume is designed as a protuberance in the chamber wall and the maximum height of the protuberance is at least five times the layer thickness of the chamber wall.

3. The portion unit of a cleaning agent according to claim 2, wherein the maximum height of the protuberance is at least ten times the layer thickness of the chamber wall.

4. The portion unit of a cleaning agent according to claim 1, wherein the at least one auxiliary volume comprises a proportion of 3-15% of the total volume.

5. The portion unit of a cleaning agent according to claim 1, wherein the chamber comprises two or more auxiliary volumes.

6. The portion unit of a cleaning agent according to claim 1, wherein the portion unit has a triangular or circular or rectangular main shape.

7. The portion unit of a cleaning agent according to claim 1, wherein the chamber wall comprises a water-soluble material.

8. The portion unit of a cleaning agent according to claim 7, wherein the water-soluble material comprises a polyvinyl alcohol copolymer.

9. The portion unit of a cleaning agent according to claim 1, wherein the chamber is filled with a plurality of cleaning agent compositions.

10. The portion unit of a cleaning agent according to claim 9, wherein the chamber is filled with a plurality of cleaning agent compositions of different dosage forms.

11. The portion unit of a cleaning agent according to claim 9, wherein the main volume is filled with a first cleaning agent composition having a first dosage form and the at least one auxiliary volume is filled with a further cleaning agent composition having a second dosage form which is different from the first.

12. The portion unit of a cleaning agent according to claim 1, wherein the portion unit is produced in a thermal vacuum thermoforming method.

13. A method for producing a portion unit of a cleaning agent according to claim 1, comprising the following steps:
  a.) preheating a first water-soluble film portion over a thermoforming mold, of which the bottom has at least one recess;
  b.) applying a negative pressure to the thermoforming mold, thereby sucking in the preheated film portion into the thermoforming mold and forming a receiving volume consisting of the first water-soluble film portion, wherein the receiving volume comprises a main volume and at least one auxiliary volume;
  c.) filling a cleaning agent composition into the receiving volume;
  d.) placing a cover element consisting of a second water-soluble film portion on the filled receiving volume;
  e.) welding the cover element to the receiving volume in an edge region by means of moisture and/or temperature such that the main volume and the at least one auxiliary volume can communicate with one another;
  f.) removing the portion unit from the thermoforming mold.

* * * * *